(12) United States Patent
Bachwani et al.

(10) Patent No.: US 9,275,225 B2
(45) Date of Patent: Mar. 1, 2016

(54) LINEAR ADDRESS MAPPING PROTECTION

(71) Applicant: INTEL CORPORATION, Santa Clara, CA (US)

(72) Inventors: Rekha N. Bachwani, Portland, OR (US); Ravi L. Sahita, Portland, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/838,091

(22) Filed: Mar. 15, 2013

(65) Prior Publication Data

US 2014/0283056 A1      Sep. 18, 2014

(51) Int. Cl.
| | | |
|---|---|---|
| *G06F 21/00* | (2013.01) | |
| *G06F 21/56* | (2013.01) | |
| *G06F 21/55* | (2013.01) | |

(52) U.S. Cl.
CPC .............. *G06F 21/56* (2013.01); *G06F 21/554* (2013.01); *G06F 21/563* (2013.01); *G06F 21/566* (2013.01)

(58) Field of Classification Search
CPC ...... G06F 21/56; G06F 21/554; G06F 21/563
USPC .......................................................... 726/23
See application file for complete search history.

(56) References Cited

U.S. PATENT DOCUMENTS

| | | | | |
|---|---|---|---|---|
| 7,001,890 B1 * | 2/2006 | Wagner | ................... | A61K 39/39 435/6.16 |
| 7,882,171 B1 * | 2/2011 | Mathieu, III | ............... | G06F 8/61 709/203 |
| 7,890,612 B2 * | 2/2011 | Todd | ..................... | G06F 21/577 709/220 |
| 8,151,352 B1 | 4/2012 | Novitchi | | |
| 8,302,193 B1 | 10/2012 | Gardner et al. | | |
| 8,420,078 B2 * | 4/2013 | Eisenbach | .......... | A61K 41/0009 424/573 |
| 8,443,442 B2 * | 5/2013 | Wang | .................. | H04L 63/1441 709/226 |
| 2009/0199297 A1 * | 8/2009 | Jarrett et al. | ..................... | 726/24 |
| 2010/0031353 A1 * | 2/2010 | Thomas et al. | .................. | 726/22 |
| 2010/0129410 A1 * | 5/2010 | Eisenbach | .......... | A61K 41/0009 424/277.1 |
| 2011/0099547 A1 * | 4/2011 | Banga | ........................... | 717/176 |
| 2011/0185433 A1 | 7/2011 | Amarasinghe et al. | | |
| 2013/0312098 A1 * | 11/2013 | Kapoor et al. | .................. | 726/24 |

FOREIGN PATENT DOCUMENTS

WO     2008/017950 A2     2/2008

OTHER PUBLICATIONS

International Search Report and Written Opinion received for PCT Patent Application No. PCT/US2014/019947, mailed on Jun. 3, 2014, 12 pages.

\* cited by examiner

*Primary Examiner* — Hadi Armouche
*Assistant Examiner* — Ali Shayanfar
(74) *Attorney, Agent, or Firm* — Baker Botts L.L.P.

(57) ABSTRACT

Technologies for securing an electronic device include determining addresses of one or more memory pages, injecting for each memory page a portion of identifier data into the memory page, storing an indication of the identifier data injected into each of the memory pages, determining an attempt to access at least one of the memory pages, determining any of the identifier data present on a memory page associated with the attempt, comparing the indication of the identifier data with the determined identifier data present on the memory page, and, based on the comparison, determining whether to allow the access.

18 Claims, 7 Drawing Sheets

| | |
|---|---|
| 505 | Save all register states and operation context to stack |
| 510 | Load ECX register with view index |
| 520 | Arm Branch Trap Flag (BTF) with write to DBGCTL_MSR register |
| 525 | Switch views with VM Function to activate access to view with protected pages |
| 530 | Disarm BTF with write to DBGCTL_MSR register |
| 535 | If current view index != ECX, jump to error processing |
| 540 | Restore register states and operation context with pop from stack. Terminate. |
| 545 | NOP segment |
| 550 | Error processing: Conduct VMcall with error code. Terminate. |

FIG. 5

LINEAR ADDRESS MAPPING PROTECTION

TECHNICAL FIELD

Embodiments of the present invention relate generally to computer security and malware protection and, more particularly, to linear address mapping protection.

BACKGROUND

Native operating system services can prevent security software from installing arbitrary hooking within the kernel of operating systems. Security software is thus prevented from filtering all behaviors of an electronic device, including potentially malicious actions by malware. Malware may include, but is not limited to, spyware, rootkits, password stealers, sources of spam, sources of phishing attacks, sources of denial-of-service-attacks, viruses, loggers, Trojans, adware, or any other digital content that produces malicious activity.

An operating system's filtering functionality may be limited, and may only be available on timelines decided by the operating system vendor. Malware can operate and reside at the same level as security software, particularly in the operating system kernel and thus compromise both the operating system and the integrity of the security software itself.

Many forms of aggressive kernel mode malware tamper with user mode memory to accomplish malicious tasks such as injecting malicious code dynamically, modifying user mode code subsections to alter execution paths and redirect into malicious code, and modifying user mode data structures to defeat security software. Additionally, some malware may attack anti-malware applications and processes from the kernel by tampering with process memory code and data subsections to deceive the detection logic.

Kernel mode rootkits and other malware employ various methods to hide their presence from user mode applications and kernel mode device drivers. The techniques used may vary, depending upon where the infection takes place. For example, malware can attack the kernel active process list of an operating system to delist or unlink a rootkit or other malware process. Other malware may tamper with the code subsections of process access and enumeration functions.

BRIEF DESCRIPTION OF THE DRAWINGS

For a more complete understanding of embodiments of the present invention, and the advantages thereof, reference is now made to the following written description taken in conjunction with the accompanying drawings, in which:

FIG. 5 is an illustration of pseudo-code for protecting against malware attacks upon a system for protecting linear address mapping.

DETAILED DESCRIPTION OF EMBODIMENTS OF THE INVENTION

Figure 1:
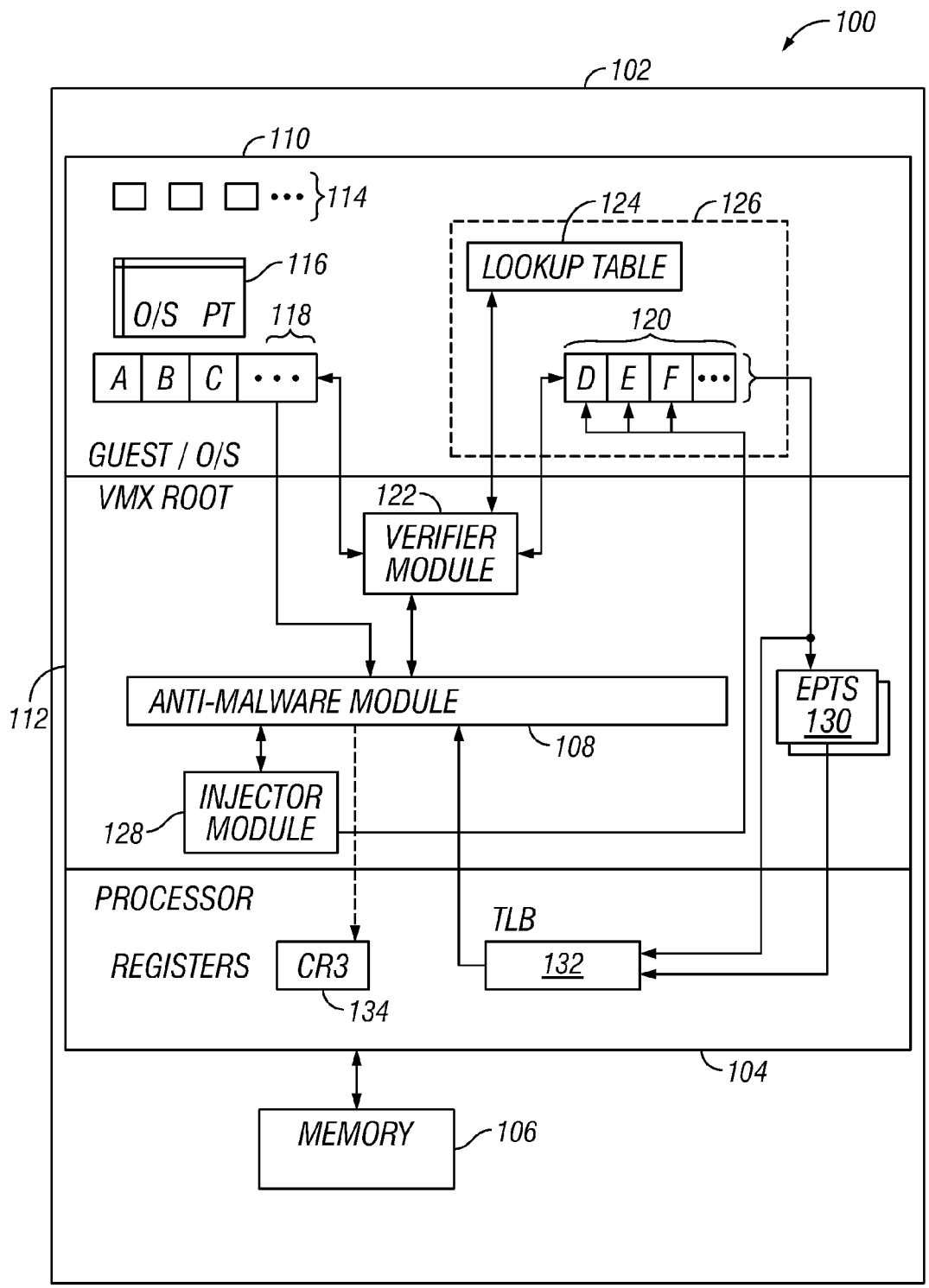
FIG. 1 is an example embodiment of a system for protecting linear address mappings in an electronic device.

FIG. 1 is an example embodiment of a system 100 for protecting linear address mappings in an electronic device. Such mappings may be vulnerable to attacks from malware. System 100 may include an anti-malware module 108 configured to protect system resources of an electronic device 102 which may affect or include such linear address mappings. In one embodiment, system 100 may protect linear address mappings by evaluating or validating the content or identity of protected pages of memory. Such evaluations or validations may be performed, for example, upon a virtualization switch or upon a branch in execution to code resident on a protected page of memory. Upon verifying a given page in memory, the page in memory may be cached in a suitable structure for repeated access by entities executing the contents of the page. Upon removal of the page from the suitable structure, anti-malware module 108 may resume monitoring for access to the page so that it may be subsequently evaluated again and returned to the suitable structure.

System 100 may be configured to protect any electronic device, such as electronic device 102. Electronic device 102 may be implemented in any suitable fashion, such as in a computer, laptop, server, console, personal data assistant, phone, mobile device, system-on-a-chip, server, or any other device configurable to interpret and/or execute program instructions and/or process data. Although electronic device 102 is illustrated with example configuration, electronic device 102 may include any suitable number or kind of components.

Anti-malware module 108 may be resident upon electronic device 102 or communicatively coupled to electronic device 102 so as to monitor access of resources. Anti-malware module 108 may be implemented in any suitable manner, such as by a program, application, script, function, library, code, software, firmware, hardware, or other mechanism for carrying out the functionality described herein.

Electronic device 102 may include an operating system ("O/S") 110 (also known as a guest operating system) which may include one or more entities 114 using operating system 110 to execute and access resources of electronic device 102. Entities 114 may include, for example, any suitable number or kind of applications, processes, programs, scripts, executables, drivers, or shared libraries. Access to system resources may be virtualized whereby memory access is made through one or more page tables ("PT") 116 in operating system 110, which may map linear memory addresses (used by operating system 110 or entities 114 to access memory) to guest physical addresses. The virtualized memory available to operating system 110 and entities 114 may be made through memory pages 118, 120. Access of memory pages 118, 120 may result in access of platform physical addresses, which may be looked up in extended page tables 130. Such platform physical addresses may be actual addresses of memory 106. Anti-malware module 108 may be configured to protect linear address mapping, such as those within PT 116, by determining whether attempted access of pages 120 are made from compromised PT 116 or are of comprised pages 120. In one embodiment, anti-malware module 108 may be configured to perform such protection by evaluating pages 120 upon a branch in execution such that execution will be made from an unprotected page to a protected page.

In addition, electronic device 102 may include a processor 104 communicatively coupled to memory 106. Processor 104 may include various resources utilized by anti-malware module 108 to protect linear address mapping. For example, processor 104 may include any suitable kind and type of resources for virtualization. Such resources may include any suitable kind or number of registers, such as a control register designated as CR3 134. In one embodiment, anti-malware module 108 may be configured to protect linear address mapping by determining whether a process context switch has been undertaken. Upon such a determination, anti-malware module 108 may be configured to perform protection by evaluating pages 120. Furthermore, processor 104 may include any suitable cache, buffer, or other structure for storing physical addresses of a page that has recently been looked up in the tables of electronic device 102. Such a structure may be used for quick access by entities 114 or operating system 110. For example, processor 104 may include a translation lookaside buffer ("TLB") 132. TLB 132 may include a data TLB or an instruction TLB.

To perform monitoring and protection of linear address mapping, system 100 may include any suitable number and kind of components for use with anti-malware module 108. Such components may be included with anti-malware module 108 or be communicatively coupled to anti-malware module 108. For example, system 100 may include an injector module 128 and a verifier module 122. Injector module 128 and verifier module 122 may be implemented by, for example, a program, application, script, function, library, code, or other mechanisms for carrying out the functionality described herein.

Anti-malware module 108 may execute partially or fully in a below-operating system area 112. Anti-malware module 108 may include a below-operating system trapping agent be configured to trap various attempted accesses of resources electronic device 101. Anti-malware module 108 may be configured to create a triggered event associated with the trapped attempted access, and to evaluate the triggered event with an event handler. In one embodiment, such an event handler may reside within anti-malware module 108. Anti-malware module 108 may be configured to consult one or more security rules to determine how to handle the triggered event. Anti-malware module 108 may also be configured to evaluate the triggered event's propensity to be an indication of malware, or a malicious attempt to subvert the resources or operation of electronic device 102. Furthermore, anti-malware module 108 may be configured to provide a determination of whether the triggered event should be allowed or denied, or may be configured to yield another corrective action.

Anti-malware module 108 may be implemented at a lower functional level than the operating systems in electronic device 102. For example, anti-malware module 108 may intercept attempted accesses of a processor 104 or memory 106. Anti-malware module 108 may be running on a processor of electronic device 102 without use of an operating system. In one embodiment, anti-malware module 108 may be operating on a bare-metal environment or execution level. Anti-malware module 108 may be running at a higher execution priority, as defined by a processor of electronic device 102, than all operating systems of electronic device 102. For example, in the context of a hierarchical protection domain model using protection rings, wherein a lower number represents a higher priority, operating system 110 may be operating at "Ring0" while anti-malware module 108 may be operating at "Ring –1." In some embodiments of processors, the concept of "Ring –1" may be known as "Ring0 privileged mode," and the concept of "Ring0" may be known as "Ring0 non-privileged mode." Operation in "Ring –1" or "Ring0 privileged mode" may entail more additional overhead and expense than "Ring0" or "Ring0 privileged mode." Operating systems of electronic device 102 may run at Ring0. On processors such as INTEL processors, the mode of "VMX Root" may be equivalent to "Ring0 privileged mode" and the mode of "VMX Non-root" may be equivalent to "Ring0."

Anti-malware module 108 may operate transparently to entities 114 running at Ring0 or higher. Thus, whether anti-malware module 108 is present or not, the attempted access of a resource may be requested by operating system 110 in the same manner. Anti-malware module 108, when enforcing a rule regarding a trapped action, may allow the request to happen, may deny the request, or may take other corrective action. To deny the request, anti-malware module 108 may simply not pass the request to the resource or processor, or may provide a spoofed or dummy reply to the request to convince the requestor that the action has occurred.

By running at "Ring –1" at a higher priority than the pertinent operating systems of electronic device 102 or below the pertinent operating systems of electronic device 102, anti-malware module 108 may avoid much of the malware that plagues operating systems such as operating system 110. Malware may trick operating system 110 or even anti-malware software running at "Ring0," as malware may also be running at "Ring0" priority. However, malware on electronic device 102 must still make requests of resources if the malware is to carry out malicious activities. Thus, trapping operations linked to sensitive resources may be better accomplished by an anti-malware module running below the level of operating systems in electronic device 102.

In one embodiment, anti-malware module 108 may be implemented in a virtual machine monitor. Such an embodiment may operate below the level of operating systems as described for anti-malware module 108.

Anti-malware module 108 may handle triggered events fully or partially in itself, or may pass off handling to one or more other modules to which anti-malware module 108 is communicatively coupled. Such other modules may be operating at the same priority ring as anti-malware module 108 or within operating system 110. Such modules may be implemented in any suitable manner.

Resources that are protected by anti-malware module 108 may include, for example, a processor such as processor 104, features of processor 104, memory such as memory 106, the entities residing in memory 106 such as data structures, or the entities residing in memory 106 for execution by the processor such as functions, processes, or applications. In the example of FIG. 1, anti-malware module 108 may be configured to protect or monitor pages 120 and CR3 134 in order to protect linear address mapping.

The resources made available for control by anti-malware module 108 may include resources—or a subset thereof—designated for virtualization. In one embodiment, anti-malware module 108 may be configured to monitor system resources for virtualized access by operating system 110 and entities 114. As examples only, such system resources may include system memory or processor resources. As examples only, processor resources may include conventional registers, debug registers, memory segmentation, memory paging, interrupts, or flags. Convention registers and debug registers may include data registers or control registers. Processor resources may also include caches, processing cores, exceptions, or specific operation codes or combinations of operation codes. Furthermore, system resources may include specific memory addresses within system memory or specific memory pages within system memory. System memory may include physical memory or virtualized memory. As described above, in the example of FIG. 1, such resources may include pages 120 and CR3 134. While CR3 134 is monitored in the example of FIG. 1, any suitable processor resource that may indicate the operation of a process switch may be monitored.

Anti-malware module 108 may be configured to trap the execution of operations originating from operating system 110 to access monitored system resources. Anti-malware module 108 may include a control structure configured to trap specific attempted accesses of system resources. Any suitable control structure may be used. In one embodiment, such a control structure may include a virtual machine control structure configured to trap such execution by providing flags for manipulation. Anti-malware module 108 may be configured to trap any suitable operation originating from operating system 110 involving an access of system resources. Such trapped operations may include, for example: reading, writing and execution of particular pages of memory or loading and storing a value to or from a processor register. Any such operations may cause a Virtual Machine Exit ("VM Exit"), which may be trapped and handled by anti-malware module 108.

As described above, anti-malware module 108 may be configured to allow or deny access to system memory by, for example, monitoring pages 120 or CR3 134. Furthermore, anti-malware module 108 may be configured to monitor PTs 116 of operating system 110 or Extended Page Tables ("EPT") 130, or any other mechanism handling the mapping of virtual memory (real memory from the perspective of a guest operating system) to host physical memory. Any such intercepted access may trigger a VM exit, which may be handled by anti-malware module 108.

Memory 106 may be in the form of physical memory or pages of virtualized memory. Virtualized memory may include memory available to, for example, operating system 110 or entities 114 and has been abstracted from physical memory and/or storage. Virtualized memory may appear as a contiguous block of memory to operating system 110 or entities 114, although the actual spaces used may be spread disparately across actual physical memory. Virtualized memory may be virtualized according to extensions of processor 104. The address space of virtualized memory may be divided into memory pages, such as pages 118 or pages 120. The memory pages may be each of equal size, such as four kilobytes. Electronic device 102 may be configured to use PTs, such as PT 116, to translate the virtual addresses of virtualized memory. For a given operating system or guest, such as operating system 110, PT 116 may include a mapping of linear virtual memory, which may appear to operating system 110 and entities 114 as contiguous memory, into a guest physical address ("GPA"). A GPA may be understood to operating system 110 as the apparent physical address to which access will be made. However, such a GPA may not actually be the physical memory address for which contents may be resident. Electronic device 102 may include EPTs 130 which contain mappings of such GPAs into actual physical addresses such as a physical platform address ("PPA"). The pages of virtual memory may be indexed in PT 116. An attempted access of virtual memory pages 118, 120 may include an attempted read, write, or execution of the page. As described in further detail below, anti-malware module 108 may be configured to trap the attempt, depending upon the protection scheme employed.

Processor 104 may comprise, for example, a microprocessor, microcontroller, digital signal processor (DSP), application specific integrated circuit (ASIC), or any other digital or analog circuitry configured to interpret and/or execute program instructions and/or process data. In some embodiments, processor 104 may interpret and/or execute program instructions and/or process data stored in memory 106. Memory 106 may be configured in part or whole as application memory, system memory, or both. Memory 106 may include any system, device, or apparatus configured to hold and/or house one or more memory modules. Each memory module may include any system, device or apparatus configured to retain program instructions and/or data for a period of time (e.g., computer-readable storage media). Instructions, logic, or data for configuring the operation of system 100, such as configurations of components such as anti-malware module 108, verifier module 122, or injector module 128 may reside in memory 106 for execution by processor 104.

Processor 104 may execute one or more code instruction(s) to be executed by the one or more cores of the processor. The processor cores may follow a program sequence of instructions indicated by the code instructions. Each code instruction may be processed by one or more decoders of the processor. The decoder may generate as its output a micro operation such as a fixed-width micro operation in a predefined format, or may generate other instructions, microinstructions, or control signals which reflect the original code instruction. Processor 104 may also include register renaming logic and scheduling logic, which generally allocate resources and queue the operation corresponding to the convert instruction for execution. After completion of execution of the operations specified by the code instructions, back end logic within processor 104 may retire the instruction. In one embodiment, processor 104 may allow out of order execution but requires in order retirement of instructions. Retirement logic within processor 104 may take a variety of forms as known to those of skill in the art (e.g., re-order buffers or the like). The processor cores of processor 104 are thus transformed during execution of the code, at least in terms of the output generated by the decoder, the hardware registers and tables utilized by the register renaming logic, and any registers modified by the execution logic.

Anti-malware module 108 may be configured to provide protection to some memory pages. A selection of which memory pages to protect may be made, for example, based upon computing resource constraints and performance issues related to monitoring. Memory pages including critical or particular sensitive elements of electronic device 102 may be selected. In the example of FIG. 1, anti-malware module 108 may be configured to provide protection for pages 120, as well as other elements defined in region 126. Anti-malware module 108 may be configured to designate pages 120 as unreadable, unwriteable, and unexecutable by any entity not trusted and verified.

To protect linear address protection related to pages 120, protection may be made of PT 116. Malware that may attempt to attack electronic device 102 may do so by attacking the contents of PTs such as PT 116. An attack may, for example, change the contents of PT 116 itself, such that malware replaces the existing page table with a new page table by modifying CR3 134, or by modifying individual elements (such as page directory or page table entries) of PT 116 for a specific process. Such a modification may otherwise result in removing protected memory assets, such as pages 120, from region 126 into unprotected (guest physical) memory. However, as illustrated in FIG. 1, PT 116 may not be monitored directly by anti-malware module 108. Directly monitoring PT 116 such that every attempted read or write of PT 116 generates a VM exit to be handled by anti-malware module 108 may be prohibitively expensive in terms of computing resources, causing significant overhead to the execution of electronic device. Such direct monitoring may cause the monitoring of every single process load and PT 116 edit. Any such context switches detected using such direct monitoring, such as those indicated by an edit of CR3 134, may cause a VM exit such that anti-malware module 108 verifies if the issuing instruction originated from a known, trusted source and that a correct address is being loaded into the register. For such direct monitoring, anti-malware module 108 may then emulate or single-step the instruction and allow the execution if the instruction originated from a trusted source and the address was correct. Otherwise, anti-malware module 108 may log an error or block the execution. Furthermore, to perform such direct monitoring in the course of preventing attacks on individual entries of PT 116, anti-malware module 108 may designate the pages that in turn comprise PT 116 structures unwriteable for code outside of region 126. The result may include generation of a VM exit on each attempt to modify such pages, which may include many legitimate operating system and processor-based modifications. For direct monitoring of PT 116, anti-malware module 108 may need to validate each such VM exit, including evaluating the source and destination of the attempt generating the VM exit. As previously mentioned, the direct monitoring of PT 116 described in these operations may be resource intensive.

Anti-malware module 108 may be configured to determine if page table mappings from PT 116 have been tampered with respect to pages 120. In one embodiment, anti-malware module 108 may be configured to overcome performance overheads associated with directly monitoring PT 116 as described above.

As described above, system 100 may include injector module 128 which may be a part of or communicatively coupled to anti-malware module 108. During setup of pages 120 as memory pages to be protected or white-listed by system 100, injector module 128 may be configured to insert a security code into each such page. Such a security code may be known only to system 100. Each page 120 may be read and subsequently loaded into TLB 132. A counter may be employed to determine the relative order of each page 120 in terms of how each such page 120 is loaded during a read of pages 120. Such an order may indicate, for example, branching execution between pages 120. Injector module 128 may be configured to insert such a counter value into each page 120. Furthermore, injector module 128 may be configured to then determine a hash, signature, or other encoding of the resulting page characteristics. For example, an exclusive-or operation (XOR), add, or more sophisticated function may be applied in combination with a secret key. The encoding may include encoding one or more of the guest linear address ("GLA") of the page, the security code, and the counter value. Injector module 128 may be configured to make such a determination for each of pages 130.

The resulting combination of a GLA and an encoded value may comprise a tuple. Injector module 128, anti-malware module 108, or another suitable portion of system 100 may be configured to store such tuples in lookup table 124. Lookup table 124 may be implemented in any suitable manner, such as a table, file, record, or other data structure. The contents of lookup table 124 may be protected by anti-malware module 108 from access by any other entity other than anti-malware module 108 or associated modules. Accordingly, lookup table 124 is illustrated as within region 126.

Furthermore, upon conclusion of setup of pages 120, injector module 128 may be configured to determine a page walk count. A page walk may occur when a processor, such as processor 104, attempts to load or read a memory page that is not currently present within a TLB, such as TLB 132. Attempting to load or read the memory page in question that is not present within TLB 132 may cause, for example, a suitable handoff or lookup operation. The handoff or lookup operation may include, for example, attempts to access the page from another TLB, a sub-TLB, or access of a page table entry. Page walk counts may be tracked in hardware by a counter in a processor, such as processor 104. The attempts to read pages not present within TLB 132 and subsequent handoff or lookup operation may cause an automatic increment of the counter by processor 104. Thus, the operations as described above that may have read or load memory pages may have also caused page walks, which may have been captured in parallel in a page walk counter of processor 104. The value of this counter may be saved as the page walk count. Use of the page walk count may be made by, for example, verifier module 122.

As described above, system 100 may include verifier module 122 which may be a part of or communicatively coupled to anti-malware module 108. Verifier module 122 may be configured to verify the encoded information, such as the security code or the counter, on a given page 120. The contents of verifier module 122 may be designated as execute-only, and thus be accessible during the execution of elements on electronic device 102 yet be non-readable by potentially malicious elements on electronic device 102. Such contents may be pinned in operating system memory such that they are not paged out by operating system 110. The designation of verified module 122 as execute-only may be accomplished by permissions within EPT 130. Thus, a read or write of verifier module 122 may cause a VM exit, which anti-malware module 108 may be configured to handle. An unauthorized read or write may be redirected, blocked, or otherwise prevented.

Verifier module 122 may be configured to perform such verification in any suitable way. In one embodiment, Verifier module 122 may be configured to verify pages 120 upon a context switch into a secured view that includes pages 120. In another embodiment, Verifier module 122 may be configured to verify pages 120 upon attempted execution of pages 120. Verified module 122 may be configured to perform such tasks by instrumenting all code branches that may cause a jump across page boundaries and into pages 120 from, for example, pages 118. The instrumentation may include a call to verifier module 122.

Verifier module 122, by validating the encoded information with respect to the address, may be more efficient than methods of validating access to PT 116. Furthermore, as pages 120 are accessed, they may be cached for faster subsequent access. Such subsequent access to the cache may not require additional checks from verifier module 122.

An attempted read of one of pages 120 will cause an attempted load of the page into TLB 132 and verified by verifier module 122. If the encoded information of the page matches the corresponding value in lookup table 124, then the data pertaining to page 120 and its correct address are confirmed. Access to page 120 as it resides in TLB 132 may be allowed so long as it remains in TLB 132. Upon a purging of TLB 132, a subsequent access of page 120 may require verification from verifier module 122.

Verifier module 122 may be configured to determine whether a present, actual page walk count—as reported by, for example, a page walk counter of processor 104—is equal to an expected page walk count. This determination may be performed as a predicate operation for determining whether pages 120 include validating information as described above. The expected page walk count may include a saved page walk count from initialization by injector module 128 or previous operation of verifier module 122. If a discrepancy exists between an expected and actual page walk count, malware may have tampered with memory 106. The comparison of the actual and expected page walk counts may be performed to possibly pre-empt the need for analyzing the pages for validating information as described above. If the actual and expected page walk counts are different, then it may be determined that malware has been detected and any suitable corrective action may be taken. For example, anti-malware module 108, other anti-malware software, a debugger, or an administrator or user may be informed. The discrepancy in counts may be used to diagnose the infection so that malware may be removed, quarantined, or otherwise handled. Furthermore, upon completion of various aspects of operation, verifier module 122 may save or store a present page walk count, so that subsequent operations of verifier module 122 may use the newly saved value as a reference point.

Figure 2A:
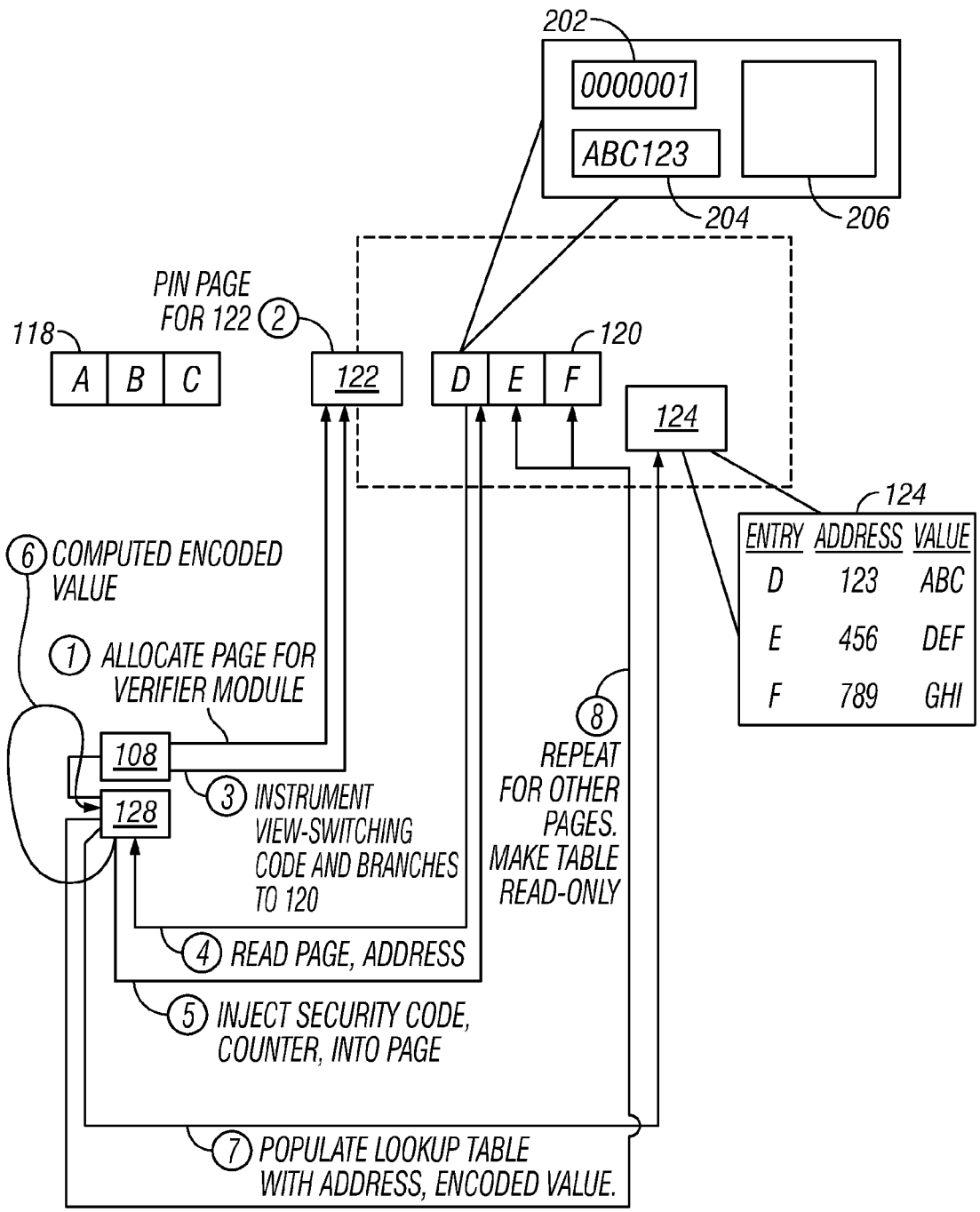
FIG. 2A illustrates example operation of a system to prepare for elements of a system to be monitored to protect linear address mapping.
Figure 2B:
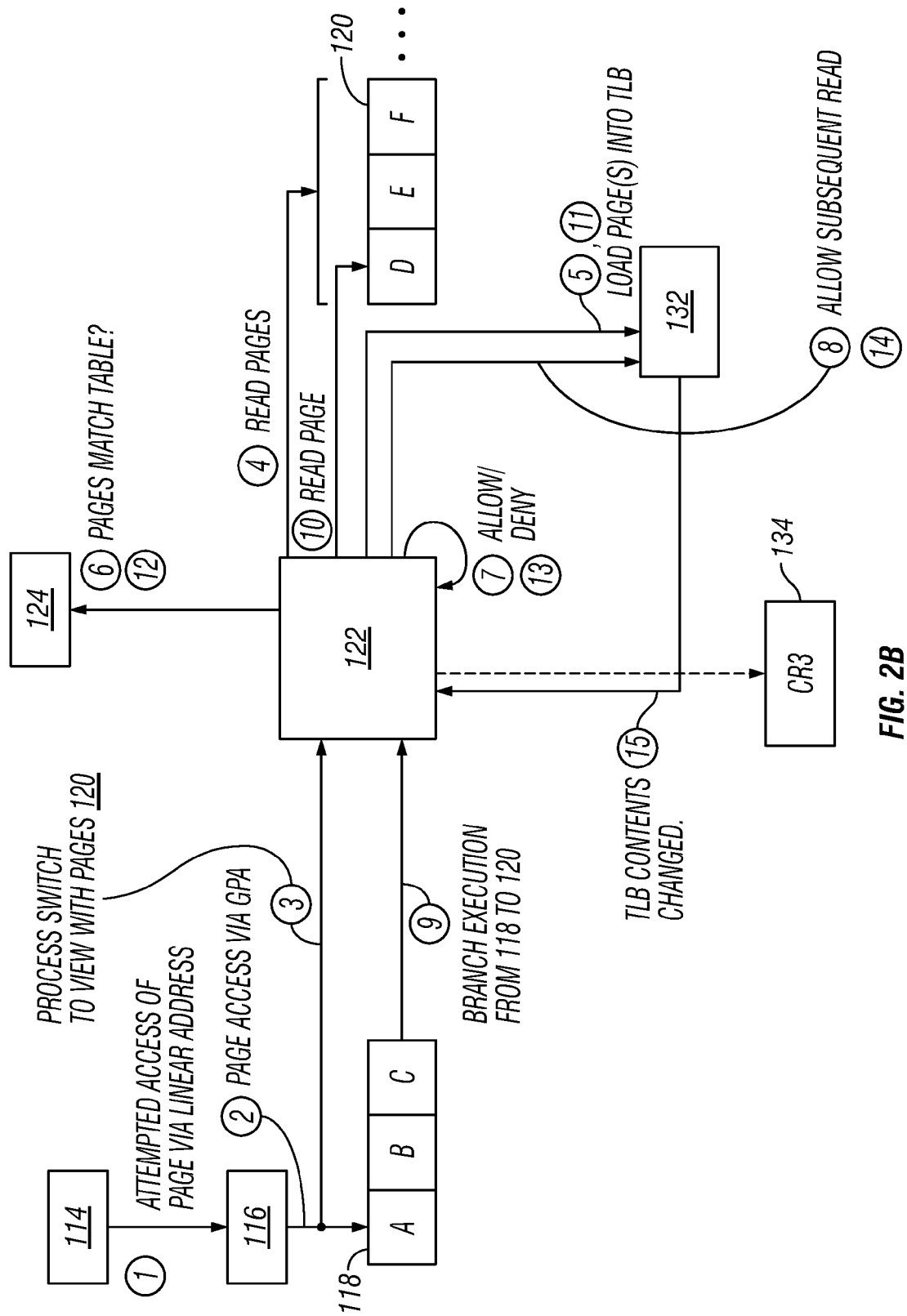
FIG. 2B illustrates example operation of a system to protect linear address mapping.

FIGS. 2A and 2B are illustrations of example operation of system 100. FIG. 2A illustrates example operation of system 100 to prepare for elements of system 100 to be monitored to protect linear address mapping. Anti-malware module 108 may determine what elements are to be protected with regards to linear address mapping, and determine what memory pages are associated with such elements. For example, pages 120 may include page D, page E, and page F which may be designated for protection.

At (1), system 100 may allocate space for the loading and execution of verifier module 122. At (2), system 100 may pin the space such that the contents are not paged out. At (3), any suitable portion of electronic device 102 may be instrumented with code for invoking verifier module 122. For example, any code for switching a view into code of pages 120 may be instrumented so as to invoke verifier module 122. The code may include, for example, specific values loaded into CR3 134. In another example, any branches across memory pages that would cross boundaries of memory pages into pages 120 may be instrumented so as to invoke verifier module 122. In one embodiment, instrumenting such code may include providing additional protections, such as defining an expected view with a secret identifier inserted or hot-patched by verifier module 122 or anti-malware module 108. The expected view definition may be later compared with presently existing views or may be protected with branch trap logic such that if a destination view is not the same as a source view, a branch trap handler may be triggered. Such instrumentation may include, for example, the pseudo-code of FIGS. 5 and 6, below.

At (4), each of pages 120 to be protected may be read by injector module 128. The contents of the page and the associated addresses may be determined. At (5), injector module 128 may insert a security code and a counter value into an individual one of pages 120, such as page D. The security code may be known to system 100, and may include any string, number, function, or other indicator. The counter may be incremented as additional pages are read and injected. At (6), injector module 128 may determine an encoded value that may be based on one or more of the address of the page 120 and the counter value. At (7), injector module 128 may populate lookup table 124 with the determined encoded value and the address of the corresponding page 120. At (8), the reading, injecting, encoding, and populating may be repeated for other ones of pages 120, such as E and F. The resulting contents of lookup table may include entries for pages D, E, F, wherein each entry includes an address and an encoded value. A current page walk count, such as that as defined by a page walk counter of processor 104, may be recorded or saved.

FIG. 2B illustrates example operation of system 100 to protect linear address mapping. At (1), an operation yielding an attempted access of a page 120 may be made by any entity 114 of operating system 110. The attempt may reference a linear address. At (2), the linear address may be mapped by PT 116 into a GPA, through which page access may be made.

At (3), the attempt may be made in conjunction with a process switch that will load a process with access to pages 120. Any suitable mechanism or method may be used to detect such a process switch. In one embodiment, such a switch may result in an identifiable value to be loaded into CR3 134. Such possible load operations may be instrumented in system 100 such that a VM exit is thus generated and handled by, for example, verifier module 122. Verifier module 122 may identify possible values that, when loaded into CR3 134, would cause a process switch so as to access pages 120.

At (4), in response to determining that a process switch has been attempted, verifier module 122 may read each of pages 120, including the address and expected encoded values. At (5), verifier module 122 may place a copy of each into TLB 132. At (6), verifier module 122 may determine whether the values read from each of pages 120 match the values stored in lookup table 124. The address of each of pages 120, as they presently reside on electronic device 102, may be used to look up the stored value in lookup table 124. If malware has tampered with linear address mapping then, for example, the order of pages as they are loaded may have changed. In another example, the content of the page may have changed or the page may have been substituted. Any such changes may result in, for example, no entry in lookup table 124 for the address of the respective page 120, or a mismatch between the encoded value stored in lookup table 124 and the encoded value in the respective page 120. Furthermore, verifier module 122 may determine whether a current page walk count—such as one provided by a page walk counter of processor 104—is equal to an expected page walk count. Such a determination may be made a predicate operation before the other comparisons to be made with lookup table 124.

At (7), verifier module 122 may allow the attempted switch if the entries in lookup table 124 match the values associated with pages 120 as they have been read. Furthermore, verifier module 122 may deny, disallow, redirect, or take other corrective action with respect to the attempted switch for any pages 120 whose values do not match expected values from lookup table 124, or wherein a current page walk count is not equal to an expected page walk count.

At (8), if the attempted switch has been allowed, then subsequent reads of the same pages 120 in TLB 132 may be allowed for various entities 114. In one embodiment, such an allowance may be made without performing a comparison between the values associated with pages 120 and lookup table 124. Direct reads from TLB 132 may be allowed until the copies of pages 120 in TLB 132 are no longer complete or present within TLB 132.

At (9), which may be conducted in parallel or in place of (3), an attempt may be made a branch of execution that may cross from a page 118 that is not monitored for protection of linear address mapping into one of pages 120 that is so monitored. The attempted access of one of pages 120 may be instrumented in system 100 such that a VM exit is thus generated and handled by, for example, verifier module 122.

At (10), in response to determining that an attempt has been made to access one of pages 120, verifier module 122 may read the one of pages 120, including the address and expected encoded values. At (11), verifier module 122 may place a copy of the one of pages 120 into TLB 132. At (12), verifier module 122 may determine whether the values read from the one of pages 120 match the values stored in lookup table 124. At (13), verifier module 122 may allow the attempted branch of execution if the values of the entry in lookup table 124 match the values associated with the one of pages 120 as is has been read. Furthermore, verifier module 122 may deny, disallow, redirect, or take other corrective action with respect to the attempted branched execution if the associated values do not match expected values from lookup table 124.

At (14), if the branched execution switch has been allowed, then subsequent reads of the same page 120 in TLB 132 may be allowed for various entities 114. In one embodiment, such an allowance may be made without performing a comparison between the values associated with pages 120 and lookup table 124. Direct reads from TLB 132 may be allowed until the copy of page 120 in TLB 132 are no longer complete or present within TLB 132.

At (15), verifier module 122 or anti-malware module 108 may be notified if the contents of pages 120, previously verified, are no longer within TLB 132 or are otherwise unavailable or compromised. Such a determination may be made in any suitable manner. For example, a performance monitor counter for a given page may determine that the page has not been accessed in a relative or specified amount of time or accesses of TLB 132. In such a case, the given page may be the best candidate for removal from TLB 132 to make room for other pages. Subsequently, a performance monitor interrupt may be generated. An interrupt descriptor table may determine that the interrupt has been generated. Verifier module 122 or anti-malware module 108 may monitor the interrupt descriptor table and determine that TLB 132 has expelled the given page. Subsequently, the respective page will not be treated as cached and known to be verified, causing a subsequent verification such as those initiated by (3) or (9).

Figure 3:
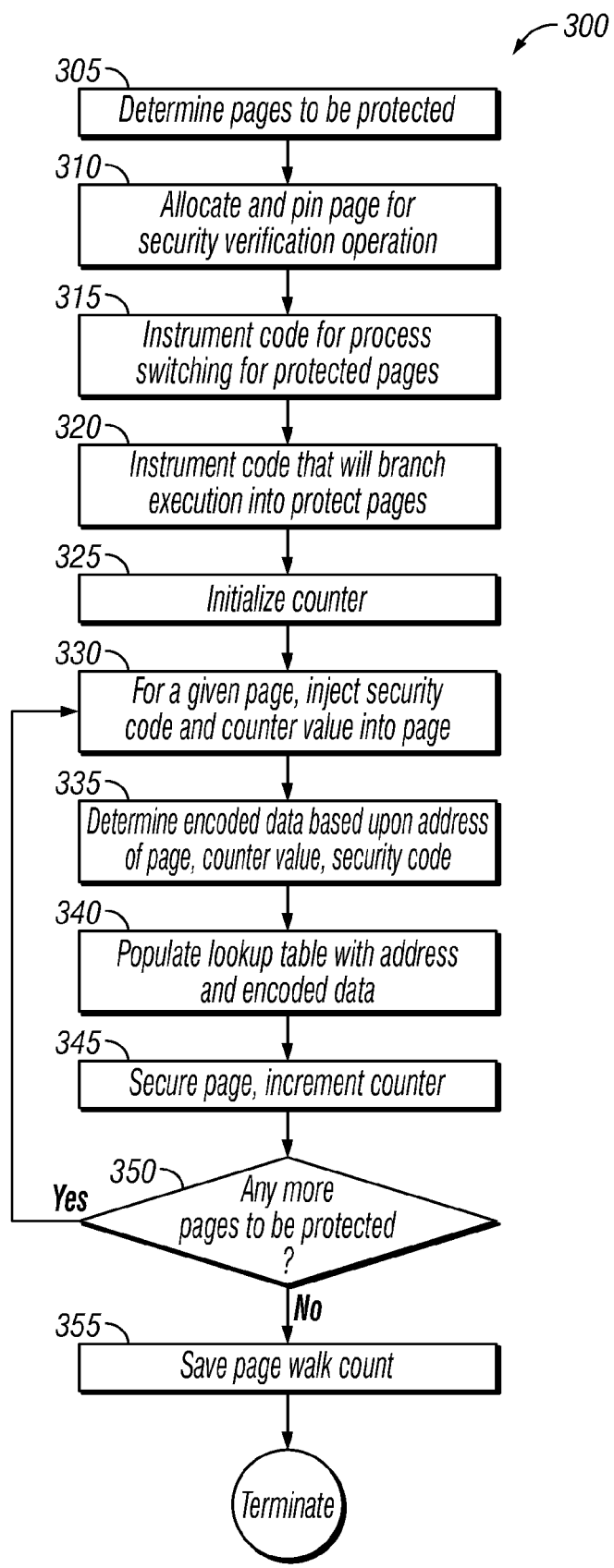
FIG. 3 is an illustration of an embodiment of an example method to initialize protection for linear address mapping.

FIG. 3 is an illustration of an embodiment of an example method 300 to initialize protection for linear address mapping.

At 305, memory pages for which linear address mapping will be protected may be determined. At 310, memory for security verification operations, such as verifier module 122, may be allocated. The allocation may be pinned in operating system space such that the contents of the operations will not be paged out in memory virtualization. The memory space may be designated as execution-only such that it may not be attacked.

At 315, code may be instrumented such that any process switches directed to views encompassing the secured memory pages will be trapped and handled. Such process switches may be defined by, for example, specific instructions directed to registers for process switching. The registers may include, for example, a CR3 register.

At 320, code may be instrumented such that any attempts to branch execution into the protected memory pages will be trapped and handled. Such branched execution may be made from an unsecured memory page or other source.

At 325, a counter may be initialized.

At 330, for a given secured page, a security code may be read. Furthermore, a security code and the counter value may be injected into the page. At 335, encoded data based upon an address of the page, the counter value, and the security code may be determined Such encoded data may be determined in any suitable function, such as an XOR, addition, or encryption function with a key. At 340, a lookup table may be populated with a copy of the encoded data. The index of the entry may equal the address of the secured page. At 345, the page may be secured by being pinned into secured memory or set so that only an authorized entity such as an anti-malware module 108 may edit, read, or execute the page. An edit, read, or execution of the page may generate a VM exit.

At 350, it may be determined whether there are any more pages that are to be secured. If so, method 300 may return to 330. If not, method 300 may proceed to 355.

At 355, a page walk count may be saved. A page walk may occur when a processor, such as processor 104, attempts to load or read a memory page that is not currently present within a TLB, such as TLB 132. Attempting to load or read the memory page in question that is not present within the TLB may cause, for example, a suitable handoff or lookup operation. The handoff or lookup operation may include, for example, attempts to access the page from another TLB, a sub-TLB, or access of a page table entry. Page walk counts may be tracked in hardware by a counter in a processor, such as processor 104. The attempts to read pages not present within the TLB and subsequent handoff or lookup operation may cause an automatic increment of the counter by the processor. Thus, the operations as described above that may have read or load memory pages may have also caused page walks, which may have been captured in parallel in a page walk counter of a processor. The value of this counter may be saved as the page walk count. Use of the page walk count may be made in, for example, method 400. Method 300 may terminate.

Figure 4:
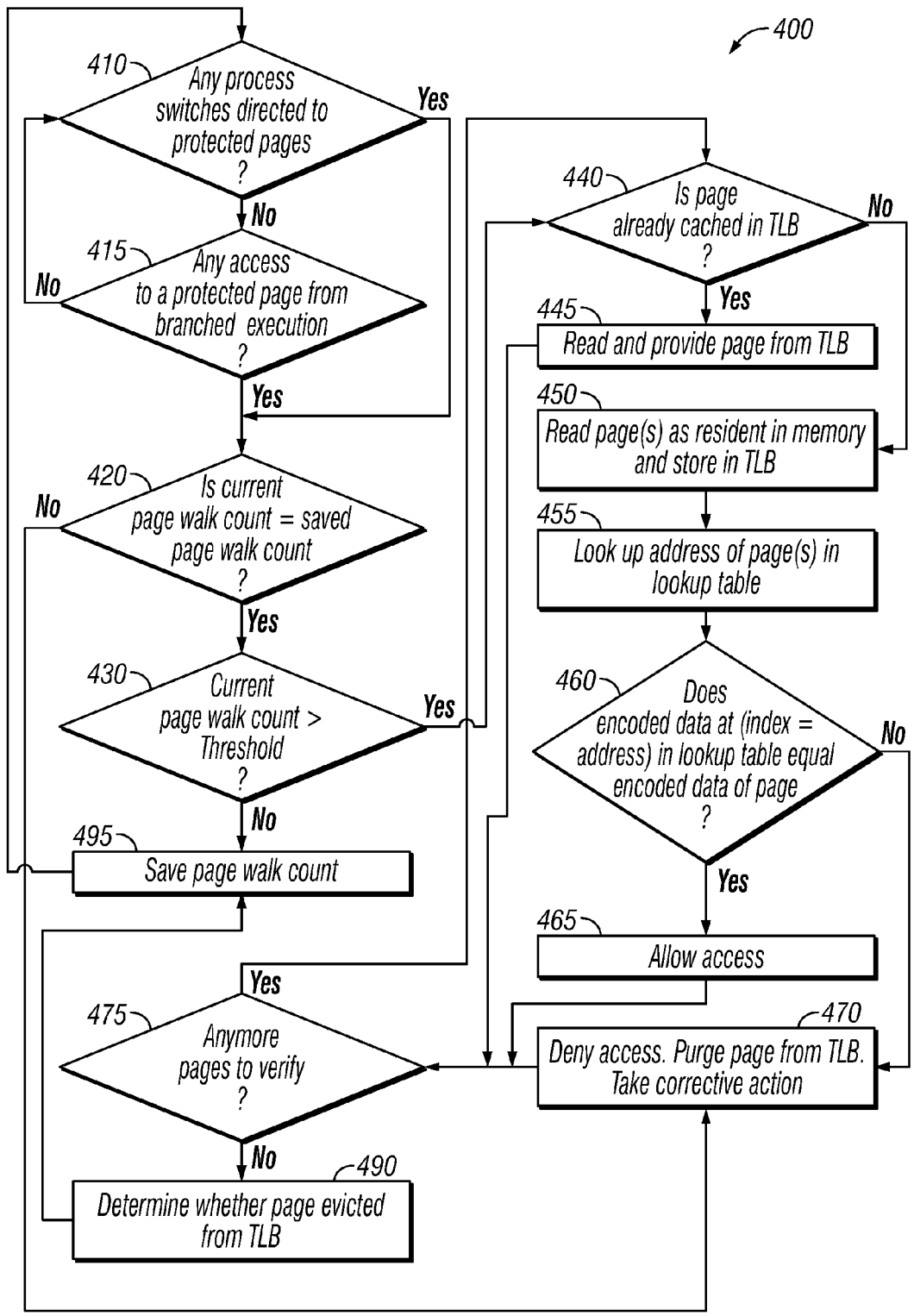
FIG. 4 is an illustration of an embodiment of an example method to perform protection for linear address mapping.

FIG. 4 is an illustration of an embodiment of an example method 400 to perform protection for linear address mapping. Method 400 may rely upon one or more elements of method 300 to have already been performed.

At 410, it may be determined whether any process switches directed to the protected pages have been made. Such a determination may be made, for example, upon detection of a VM exit resulting from an attempted access of a register such as CR3. If no such switches have been detected, method 300 may proceed to 415. If such switches have been detected, method 300 may proceed to 420.

At 415, it may be determined whether any branched execution to a protected page has been made. Such a determination may be made, for example, upon detection of a VM exit resulting from an attempted execution of the protected memory page. If such an execution has been detected, method 300 may proceed to 420. If such an execution has not been detected, method 300 may return to 410.

At 420, it may be determined whether a current page walk count—as determined by a present access of, for example, a page walk counter of a processor—is equal to a stored value of a page walk count. Such a stored value of a page walk count may have been determined, for example, in 355 of method 300 or in 495 as described below during a previous iteration of method 400. If the current page walk count is different than the previous page walk count, the underlying pages, page table entries, EPTs, or other aspects of the secured memory may have been altered by malware. The comparison of 420 may thus serve as a heuristic, short-cut, or preliminary decision for the analysis as described below in conjunction with the rest of 400. In some cases, such additional analysis, as described below, may have resulted in the conclusion that malware is present, similar to a determination in 420 that the page walk count indicates a memory alteration. Thus, 420 may be performed to save processing resources that may be spent in additional steps. If the current page walk count is different than the saved page walk count, method 400 may proceed to 470. If the current page walk count is the same as the saved page walk count, method 400 may conduct additional analysis. In one embodiment, method 400 may proceed to 430 if the current page walk count is the same as the saved page walk count. In another embodiment, method 400 may proceed to 440 if the current page walk count is the same as the saved page walk count.

Method 400 may perform 430 in order to determine whether analysis, such as analysis to be performed in 440, 445, 450, 455, 460, 465, and 470, is to be performed upon availability of all pages. In such a case, by performing 430, method 400 may first perform a saved page walk count check—such as described in conjunction with 420—for each page to be loaded and checked before performing any additional analysis. Method 400 may skip 430 and perform 440, such that method 400 performs additional analysis for each page as the page is loaded and checked. At 430, it may be determined whether the current page walk count is less than a threshold. Such a threshold may be specified as, for example, the total number of pages to be loaded and analyzed. In another example, such a threshold may be specified as a fraction of the total number of pages to be loaded and analyzed so that additional analysis may be performed more often or guaranteed to be performed at least once. If the current page walk count is less than a threshold, additional analysis may be postponed and method 400 may proceed to 495. If the current page walk count is equal to or greater than a threshold, the method 400 may proceed to 440.

At 440, it may be determined whether the accessed page or pages are already cached within a structure such as a TLB. If so, at 445, the TLB may be read, the page provided, and execution allowed. Method 300 may return to 410. If the accessed page or pages is not already cached within the TLB, method 300 may proceed to 450.

At 450, the accessed page or pages as resident within memory may be read. The page or pages may be stored in the TLB. At 455, the page or pages may be verified. The verification may be made, for example, by determining the address of the page or each of the pages and looking up the address or addresses in the lookup table to determine the corresponding entry or entries, if any. At 460, it may be determined whether the encoded data at the corresponding entry or entries in the lookup table is equal to the encoded data within the page or pages. If so, at 465, access may be allowed and method 300 may proceed to 475. If not, method 300 may proceed to 470.

At 470, it may be determined that the access represents a malicious attempt to access secured resources, or an attempt to harm the anti-malware provisions of a system. The access may be denied, redirected, or other corrective action taken. Anti-malware corrective action may be taken. Anti-malware software may be notified with an automatically generated report. The page may be purged or otherwise removed from the TLB. The method may proceed to 475.

At 475, it may be determined whether there are any more pages for which an attempt has been made. Such access to a page may be verified using, for example, 440, 445, 450, 455, 460, 465, and 470. If there are additional pages to verify, method 400 may proceed to 440. If there are no additional pages to verify, method 400 may proceed to 490.

At 490, it may be determined whether any page has been evicted or otherwise rendered unusable within the TLB. Such a determination may be made, for example, by receiving a performance monitoring interrupt. The determination may be used in subsequent operations of, for example, 440.

At 495, a present page walk count may be saved. Such a present page walk count may be determined by, for example, accessing a page walk counter of a processor. The page walk count may have been incremented during operation of method 400 thus far. Such incrementing may have been performed by a processor in parallel to the described steps of method 400. Method 400 may return to 410.

Although FIGS. 3 and 4 discloses a particular number of steps to be taken with respect to example methods 300 and 400, methods 300 and 400 may be executed with more or fewer steps than those depicted in FIGS. 3 and 4. For example, in various embodiments only one of 315 and 320 may be performed. In addition, although FIGS. 3 and 4 disclose a certain order of steps to be taken with respect to methods 300 and 400, the steps comprising these methods may be completed in any suitable order. For example, in various embodiments, 397 may be conducted at any time an associated interrupt is received. Methods 300 and 400 may be implemented using the systems of FIGS. 1-2 or any other suitable mechanism. In certain embodiments, methods 300 and 400 may be implemented partially or fully in software embodied in computer-readable storage media. Methods 300 and 400 may be performed by the same or different entities or systems. Method 400 may be performed upon partial or total completion of method 300. Methods 300 and 400 may be conducted in parallel to each other in varying degrees.

FIG. 5 is an illustration of pseudo-code for protecting against malware attacks upon a system for protecting linear address mapping. Pseudo-code may be used for instrumentation of code or instructions that may be used upon, for example, execution or invocation of verifier module 122. The execution or invocation of verifier module 122 may include a process switch to a secured view. The pseudo-code of FIG. 5 may protect against unauthorized jumps, branches, or other operations that attempt unauthorized access to secured memory pages, such as pages 120, in a secured view.

A secured view may include a view directed to secured memory pages, such as pages 120. A view may include a hierarchy of virtual memory page mappings in, for example, EPTs 130. A switch from one view to another view may include a loading or access of a different hierarchy of memory pages. Access of a given memory page may thus cause a switch of views, wherein a different set of such pages may be attempted to be loaded. A secured view may thus include a hierarchy of memory pages that are secured by system 100 as described above in region 126, such as pages 120. An unsecured view may thus include a hierarchy of memory pages that lie outside region 126. System 100 may include any suitable number and type of views, including secured views and unsecured views. A given view may be identified by a unique index or other identifier, by which such a view is tracked in system 100.

As described above, the pseudo-code of FIG. 5 may be instrumented for execution upon a switch to a secured view. The pseudo-code of FIG. 5 may be included in or be communicatively coupled to, for example, verifier module 122. The pseudo-code of FIG. 5 may be placed within a memory page or location that is marked as execute-only, so as to prevent unauthorized manipulation of its contents. Reading or writing from the memory page or location may be forbidden.

Pseudo-code 505 may cause performance of operations to save all register states and other operation contexts. Such information may be made, for example, by pushing register values to a stack. Operations may proceed to pseudo-code 510.

Pseudo-code 510 may cause performance of operations to load register states such that an index of the destination view may be stored for safe keeping. Such an operation may include hot-patching values by anti-malware module 108 or other portions of VMX root 112 such that the values cannot be read by malware. Specifically, an ECX register may be loaded with the presently used view index. The load operation may include use of a "mov immediate" instruction on the execute-only memory page. Such a "mov immediate" instruction may include an instruction format to take a value specified inline with an instruction and place it into a general purpose processor register. In such a way, the immediate value can be accessible on a page that may not otherwise be readable or writeable. Thus, the value is considered to be part of the executing instruction. Accordingly, one must execute the code in order to reveal the value if it is used, as it is here, on a page whose permissions are set to execute-only in an extended page table. Thus, system 100 may keep the value accessible from within the secured operations described while preventing malware from simply reading the value from a page in memory. An EAX register may be loaded with a leaf for extended-page-table pointers. Operations may proceed to pseudo-code 520.

Pseudo-code 520 may cause performance of operations to set up and arm a Branch Trap Flag (BTF) such that handler operations may be executed. Such handler operations may include, for example, the pseudo-code illustrated in FIG. 6. The branch trap flag may be configured to trigger operation of the handler upon, for example, a branch in execution. Such a branch in execution may include malware attempting to branch directly into protected memory. The branch of execution may cause an exception to be raised which will load the handler code to evaluate the branch that caused the exception. Specifically, a write may be made to a debug control model specific register, such as DBGCTL_MSR. Operations may proceed to pseudo-code 525.

Pseudo-code 525 may cause performance of operations to perform the view switch. Such a view switch may include activating one or more EPTs associated with memory pages for the destination view. Specifically, a call to a VM function such as VMFUNC may be made. The call to the VM function may include an indication of the switch in terms of leaf descriptors. Operations may proceed to pseudo-code 530.

Upon completion of the switch and subsequent operations, pseudo-code 530 may cause performance of operations to disarm the BTF. Such disarming may be made through a write to a debug control model specific register, such as DBGCTL_MSR. Operations may proceed to pseudo-code 535.

Pseudo-code 535 may cause performance of operations to perform a check that the view has not been manipulated or changed. Specifically, the current view index may be compared to an expected value such as the stored view index. Such a stored view index value may include the one stored in the ECX. If there is a discrepancy, operations may jump to error handling, such as that performed in pseudo-code 550. Otherwise, operations may proceed to pseudo-code 540.

If the expected and actual indices are the same, the pseudo-code 540 may cause performance of operations to restore register states and operation contexts. Specifically, entry points may be determined or set and values may be popped from the stack. Execution may be returned to the calling entity and execution of the pseudo-code may terminate.

Pseudo-code 545 may cause performance of operations to perform no actions. Specifically, pseudo-code 545 may include a long segment of, for example, NOPs. Pseudo-code 545 may be large compared to other pseudo-code segments of FIG. 5 and may, for example, fill up all remaining space in a memory page. Malware that is attacking system 100 may attempt to randomly branch into different portions of memory 106. By providing a large segment of NOPs, pseudo-code 545 may cause any such malware randomly branching into the memory page to make it statistically likely that the destination will be a string of NOPs. The string of NOPs may cause harmless execution, leading to error handling in pseudo-code 550. Thus, an impermissible branch into the memory page may be immediately handled.

Pseudo-code 550 may cause performance of operations to perform error handling. Any suitable handling may be performed. For example, a VMcall may be made with an error code. The VMcall may cause corrective action to be taken by, for example, anti-malware module 108. Execution of the pseudo-code may terminate.

Figure 6:
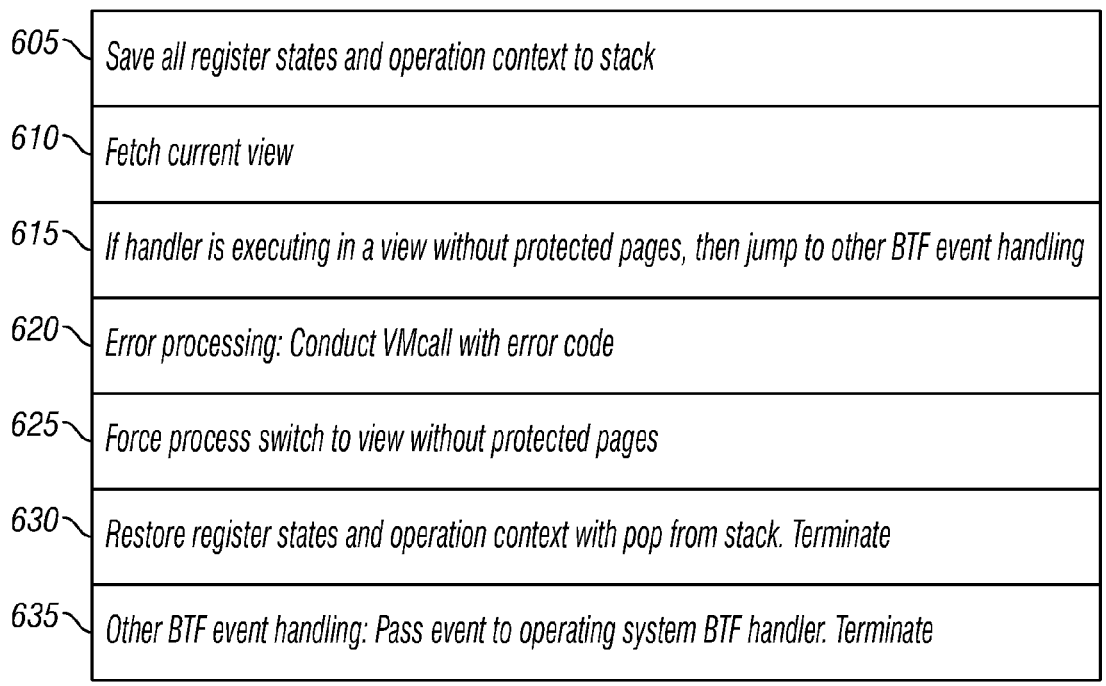
FIG. 6 is an illustration of further pseudo-code for protecting against malware attacks upon a system for protecting linear address mapping.

FIG. 6 is an illustration of further pseudo-code for protecting against malware attacks upon a system for protecting linear address mapping. Such pseudo-code may provision operations of, for example, branch-execution handling for detection of a BTF set in the pseudo-code of FIG. 5. The pseudo-code of FIG. 6 may be included in or be communicatively coupled to, for example, verifier module 122. The pseudo-code of FIG. 6 may be placed within a memory page or location that is marked as execute-only, so as to prevent unauthorized manipulation of its contents. The pseudo-code of FIG. 6 may be placed entirely within a single physical memory page. Reading or writing from the memory page or location may be forbidden.

Pseudo-code 605 may cause performance of operations to save all register states and other operation contexts. Such information may be made, for example, by pushing register values to a stack. Operations may proceed to pseudo-code 605.

Pseudo-code 610 may cause performance of operations to fetch or determine the index of the current or active view.

Pseudo-code 615 may cause performance of operations to determine whether the handler is executing in a view with or without protected pages. Such a determination may be made by evaluating whether the index of the current view corresponds to known indices of protected views. If the handler is executing in a view without protect pages, then operation may proceed to pseudo-code 635 for handling. In such a case, further analysis may be unnecessary because the branch has been made into memory that is not protected, such as pages 118. Otherwise, operations may proceed to pseudo-code 620. In such a case, the branch has been made to protected memory, such as pages 120.

Pseudo-code 620 may cause performance of operations to conduct error processing. Any suitable handling may be performed. For example, additional analysis may be performed. In another example, a VMcall may be made with an error code. The VMcall may cause corrective action to be taken by, for example, anti-malware module 108.

Pseudo-code 625 may cause performance of operations to force a process switch to a view without protected pages, if it is determined that an unauthorized branch has been performed. Such a forced switch may include calling VMFUNC.

Pseudo-code 630 may cause performance of operations to restore register states and operation contexts. Specifically, values may be popped from the stack. Execution may be returned to the calling entity and execution of the pseudo-code may terminate.

Pseudo-code 635 may cause performance of operations to call another BTF handler, such as one performed by an operating system. The BTF may have been set for another reason not handled by the pseudo-code of FIG. 6, and the call to the other BTF handler may provide for such a situation. Execution of the pseudo-code may terminate.

Although FIGS. 5 and 6 disclose pseudo-code, FIGS. 5 and 6 may also illustrate steps of a method. The order of the pseudo-code in FIGS. 5 and 6 may indicative of an order of steps of a method, while branching options within such pseudo-code may be indicative of decision points and branching within a corresponding method. Although FIGS. 5 and 6 discloses a particular number of portions of pseudo-code to be performed, the pseudo-code of FIGS. 5 and 6 may be executed with more or fewer steps than those depicted in FIGS. 5 and 6. In addition, although FIGS. 5 and 6 disclose a certain order of pseudo-code, the commands comprising such pseudo-code may be completed in any suitable order. The pseudo-code of FIGS. 5 and 6 may be implemented using the systems of FIGS. 1-2 or any other suitable mechanism. In certain embodiments, the pseudo-code of FIGS. 5 and 6 may be implemented partially or fully in software embodied in computer-readable storage media. The pseudo-code of FIGS. 5 and 6 may be performed by the same or different entities or systems. The pseudo-code of FIG. 6 may be performed upon a detection of a BTF flag or other operation set bad the pseudo-code of FIG. 5. Thus, the pseudo-code of FIG. 6 may be performed upon partial or total completion of the pseudo-code of FIG. 5. The pseudo-code of FIGS. 5 and 6 may be performed in parallel with respect to each other to varying degrees. Each portion of the pseudo-code of FIGS. 5 and 6 may be implemented in any suitable language, logic, commands, instructions, routines, functions, function calls, code, object code, or other suitable mechanism. The pseudo-code of FIGS. 5 and 6 may include instructions in memory 106 for execution by processor 104 that, when read and loaded, cause the processor to perform the operations described above.

Program instructions may be used to cause a general-purpose or special-purpose processing system that is programmed with the instructions to perform the operations described above. The operations may be performed by specific hardware components that contain hardwired logic for performing the operations, or by any combination of programmed computer components and custom hardware components. Method 300 may be provided as a computer program product that may include one or more machine-readable media having stored thereon instructions that may be used to program a processing system or other electronic device to perform the methods. The terms "machine-readable medium" or "computer-readable medium" used herein shall include any medium that is capable of storing or encoding a sequence of instructions for execution by the machine and that causes the machine to perform any one of the methods described herein. The term "machine-readable medium" shall accordingly include, but not be limited to, memories such as solid-state memories, optical and magnetic disks. Furthermore, it is common in the art to speak of software, in one form or another (e.g., program, procedure, process, application, module, logic, and so on), as taking an action or causing a result. Such expressions are merely a shorthand way of stating that the execution of the software by a processing system causes the processor to perform an action or produce a result.

The following examples pertain to further embodiments.

A method for securing an electronic device may include determining addresses of one or more memory pages, injecting a portion of identifier data for each memory page into the memory page, storing an indication of the identifier data injected into each of the memory pages, determining an attempt to access at least one of the memory pages, determining any of the identifier data present on a memory page associated with the attempt, comparing the indication of the identifier data with the determined identifier data present on the memory page, and, based on the comparison, determining whether to allow the access. Determining an attempt to access at least one of the memory pages may include detecting an execution of code from an unprotected memory page. Determining an attempt to access at least one of the memory pages may include detecting a process switch. Determining an attempt to access at least one of the memory pages may further include, for each of the memory pages, determining any identifier data present on each memory page, comparing each corresponding indication of identifier data with the determined identifier data present on each memory page, and, based on the comparisons, determining whether to allow the access. The identifier data may be based upon one or more of a counter value, an address of the memory page, and security code. The counter value may include an indication of a normal load order of memory pages. The identifier data may be encoded. The method may further include storing the memory page into a cache, determining an additional attempt to access at least one of the memory pages, and, based on a presence of the memory page in the cache, determining whether to allow the additional access.

At least one machine-readable storage medium may include computer-executable instructions carried on the computer-readable medium. The instructions may be readable by a processor. The instructions, when read and executed, may cause the processor to determine addresses of one or more memory pages, inject a portion of identifier data for each memory page into the memory page, store an indication of the identifier data injected into each of the memory pages, determine an attempt to access at least one of the memory pages, determine any of the identifier data present on a memory page associated with the attempt, compare the indication of the identifier data with the determined identifier data present on the memory page, and, based on the comparison, determine whether to allow the access. Determining an attempt to access at least one of the memory pages may include detecting an execution of code from an unprotected memory page. Determining an attempt to access at least one of the memory pages may include detecting a process switch. Determining an attempt to access at least one of the memory pages may further include, for each of the memory pages, determining any identifier data present on each memory page, comparing each corresponding indication of identifier data with the determined identifier data present on each memory page, and, based on the comparisons, determining whether to allow the access. The identifier data may be based upon one or more of a counter value, an address of the memory page, and security code. The counter value may include an indication of a normal load order of memory pages. The identifier data may be encoded. The medium may further include instructions for causing the processor to store the memory page into a cache, determine an additional attempt to access at least one of the memory pages, and, based on a presence of the memory page in the cache, determine whether to allow the additional access.

A system for securing an electronic device may include an anti-malware module communicatively coupled to a processor, the processor, and a memory communicatively coupled to the processor. The anti-malware module may be configured to determine addresses of one or more memory pages, inject a portion of identifier data for each memory page into the memory page, store an indication of the identifier data injected into each of the memory pages, determine an attempt to access at least one of the memory pages, determine any of the identifier data present on a memory page associated with the attempt, compare the indication of the identifier data with the determined identifier data present on the memory page, and, based on the comparison, determine whether to allow the access. Determining an attempt to access at least one of the memory pages may include detecting an execution of code from an unprotected memory page. Determining an attempt to access at least one of the memory pages may include detecting a process switch. Determining an attempt to access at least one of the memory pages may further include, for each of the memory pages, determining any identifier data present on each memory page, comparing each corresponding indication of identifier data with the determined identifier data present on each memory page, and, based on the comparisons, determining whether to allow the access. The identifier data may be based upon one or more of a counter value, an address of the memory page, and security code. The counter value may include an indication of a normal load order of memory pages. The identifier data may be encoded. The anti-malware module may be configured to cause the processor to store the memory page into a cache, determine an additional attempt to access at least one of the memory pages, and, based on a presence of the memory page in the cache, determine whether to allow the additional access.

A system for securing an electronic device may include means for determining addresses of one or more memory pages, injecting a portion of identifier data for each memory page into the memory page, storing an indication of the identifier data injected into each of the memory pages, determining an attempt to access at least one of the memory pages, determining any of the identifier data present on a memory page associated with the attempt, comparing the indication of the identifier data with the determined identifier data present on the memory page, and, based on the comparison, determining whether to allow the access. Determining an attempt to access at least one of the memory pages may include detecting an execution of code from an unprotected memory page. Determining an attempt to access at least one of the memory pages may include detecting a process switch. Determining an attempt to access at least one of the memory pages may further include, for each of the memory pages, determining any identifier data present on each memory page, comparing each corresponding indication of identifier data with the determined identifier data present on each memory page, and, based on the comparisons, determining whether to allow the access. The identifier data may be based upon one or more of a counter value, an address of the memory page, and security code. The counter value may include an indication of a normal load order of memory pages. The identifier data may be encoded. The means may further include storing the memory page into a cache, determining an additional attempt to access at least one of the memory pages, and, based on a presence of the memory page in the cache, determining whether to allow the additional access.

Although the present disclosure has been described in detail, it should be understood that various changes, substitutions, and alterations can be made hereto without departing from the spirit and the scope of the disclosure as defined by the appended claims.

What is claimed is:

1. A system for securing an electronic device, comprising:
   a hardware processor;
   a memory communicatively coupled to the processor; and
   an anti-malware module communicatively coupled to the hardware processor and including instructions on the memory, the instructions, when executed by the hardware processor, configure the anti-malware module to:
   determine addresses of one or more memory pages in the memory;
   for each memory page, inject a portion of identifier data into the memory page;
   store an indication of the identifier data injected into each of the memory pages;
   determine an attempt to access a plurality of the memory pages, including detecting a process switch;
   determine any of the identifier data present on each memory page associated with the attempt;
   compare each corresponding indication of identifier data with the determined identifier data present on each memory page; and
   based on the comparisons, determine whether to allow the access.

2. The system of claim 1, wherein determining an attempt to access at least one of the memory pages comprises detecting an execution of code from an unprotected memory page.

3. The system of claim 1, wherein determining an attempt to access at least one of the memory pages comprises detecting a process switch.

4. The system of claim 1, wherein:
   the identifier data is based upon one or more of a counter value, an address of the memory page, and security code; and
   the counter value includes an indication of a normal load order of memory pages.

5. The system of claim 1, wherein the anti-malware module is further configured to:
   store the memory page into a cache;
   determine an additional attempt to access at least one of the memory pages; and
   based on a presence of the memory page in the cache, determine whether to allow the additional access.

6. The system of claim 1, wherein the identifier data is encoded.

7. A method for securing an electronic device, comprising:
   determining addresses of one or more memory pages;
   for each memory page, injecting a portion of identifier data into the memory page;
   storing an indication of the identifier data injected into each of the memory pages;
   determining an attempt to access a plurality of memory pages, including detecting a process switch;
   determining any of the identifier data present on each memory page associated with the attempt;
   comparing each corresponding indication of identifier data with the determined identifier data present on each memory page; and
   based on the comparisons, determining whether to allow the access.

8. The method of claim 7, wherein determining an attempt to access at least one of the memory pages comprises detecting an execution of code from an unprotected memory page.

9. The method of claim 7, wherein determining an attempt to access at least one of the memory pages comprises detecting a process switch.

10. The method of claim 7, wherein:
    the identifier data is based upon one or more of a counter value, an address of the memory page, and security code; and
    the counter value includes an indication of a normal load order of memory pages.

11. The method of claim 7, wherein the identifier data is encoded.

12. The method of claim 7, further comprising:
    storing the memory page into a cache;
    determining an additional attempt to access at least one of the memory pages; and
    based on a presence of the memory page in the cache, determining whether to allow the additional access.

13. At least one non-transitory machine-readable storage medium, comprising computer-executable instructions carried on the computer-readable medium, the instructions readable by a processor, the instructions, when read and executed, for causing the processor to:
    determine addresses of one or more memory pages;
    for each memory page, inject a portion of identifier data into the memory page;

store an indication of the identifier data injected into each of the memory pages;
determine an attempt to access a plurality of the memory pages including detecting a process switch;
determine any of the identifier data present on each memory page associated with the attempt;
compare each corresponding indication of identifier data with the determined identifier data present on each memory page; and
based on the comparisons, determine whether to allow the access.

14. The medium of claim 13, wherein determining an attempt to access at least one of the memory pages comprises detecting an execution of code from an unprotected memory page.

15. The medium of claim 13, wherein determining an attempt to access at least one of the memory pages comprises detecting a process switch.

16. The medium of claim 13, wherein:
the identifier data is based upon one or more of a counter value, an address of the memory page, and security code; and
the counter value includes an indication of a normal load order of memory pages.

17. The medium of claim 13, wherein the identifier data is encoded.

18. The medium of claim 13, further comprising instructions for causing the processor to:
store the memory page into a cache;
determine an additional attempt to access at least one of the memory pages; and
based on a presence of the memory page in the cache, determine whether to allow the additional access.

* * * * *